United States Patent [19]

Reynolds

[11] 4,165,362

[45] Aug. 21, 1979

[54] HYDROMETALLURGICAL PROCESSING OF MOLYBDENITE ORE CONCENTRATES

[75] Inventor: Victor R. Reynolds, Weston, Conn.

[73] Assignee: Engelhard Minerals & Chemicals Corporation, Iselin, N.J.

[21] Appl. No.: 896,106

[22] Filed: Apr. 13, 1978

Related U.S. Application Data

[63] Continuation of Ser. No. 786,101, Apr. 8, 1977, abandoned.

[51] Int. Cl.$^2$ ............................................. C01G 39/00
[52] U.S. Cl. ........................................ 423/53; 423/55; 423/606
[58] Field of Search ........................... 423/53, 55, 606

[56] References Cited

U.S. PATENT DOCUMENTS

| | | | |
|---|---|---|---|
| 3,656,888 | 4/1972 | Barry et al. | 423/606 |
| 3,714,325 | 1/1973 | Bloom et al. | 423/53 |
| 3,911,076 | 10/1975 | Probert et al. | 423/53 |
| 3,988,418 | 10/1976 | Kerfoot et al. | 423/53 |

OTHER PUBLICATIONS

Usataya, "Chemical Absts.", vol. 47, 1953, p. 5313d.
Dresher et al., "Journal of Metals", Jun. 1956, pp. 794–800.
Bjorling et al., "J. Chem. VAR.", vol. 12, 1969, pp. 423–435.

*Primary Examiner*—Herbert T. Carter

[57] ABSTRACT

An improved process is described for the hydrometallurgical liquid phase oxidation of molybdenum disulfide ore concentrates, in which the reactants include in the range of from about 0.12 to about 1.68 mols of an alkali metal hydroxide, preferably sodium hydroxide, per mol of molybdenite, and the time of the reaction, the amount of the alkali metal hydroxide, and the reaction temperature and pressure are coordinated to achieve at least a 95% oxidation conversion of the molybdenum disulfide.

11 Claims, No Drawings

HYDROMETALLURGICAL PROCESSING OF MOLYBDENITE ORE CONCENTRATES

This is a division of application Ser. No. 786,101, filed Apr. 8, 1977, and now abandoned.

This invention is directed to the oxidation in a liquid aqueous slurry of molybdenum disulfide to hexavalent molybdenum, predominantly molybdic trioxide.

In 1956. Dresher, et al., J. Metals, pp. 794–800 (June 1956) disclosed a process for the oxidation of molybdenite with molecular oxygen in an aqeuous potassium hdroxide solution at elevated temperatures (100°–175° C.) and pressures (up to 700 psi) to form a solution of water-soluble molybdate ions (MoO4X), according to the reaction:

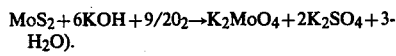

In order to obtain a solid molybdenum-containing product, the mother liquor from the reaction had to be treated with, for instance, a calcium salt to precipitate calcium molybdate, for which there is somewhat limited commercial utility.

U.S. Pat. No. 3,656,888 discloses a process for oxidizing a molybdenite ore concentrate to molybdic trioxide by employing a liquid phase slurry maintained at an elevated temperature and pressure and employing gaseous molecular oxygen as the oxidizing agent. The reaction is:

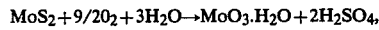

with the molybdic trioxide (monohydrate) forming a solid phase and being separable by filtration. Further, this patent emphasizes the need of fine grinding. A particle size of less than 200 mesh preferably less than 20 microns and better still less than 5 microns, is necessary to promote the efficiency of the oxidation reaction and also to facilitate the formation and maintenance of a uniform aqueous dispersion. However, a substantial amount of the molybdenum remains in solution as slightly soluble molybdic acid even when the reaction is continued to a terminal pH of the slurry of about zero or less. Because of the economic value of the molybdenum in the mother liquor, in commercial practice the mother liquor must be further processed for recovery of it. Furthermore, the process has a relatively poor yield, as stated in the examples of the patent.

It has now been discovered that the total oxidative conversion of tetra-valent molybdenum, as molybdenum disulfide, to hexavalent molybdenum, and also the yield of solid molydbic trioxide recovered in the solids fraction (both based on the total molybdenum disulfide in the charge to the reaction zone), may be increased by adding to the reaction zone a minor amount, in the range of about 0.12 to about 1.68 mols, of a strong hydroxide per mol equivalent of molybdenum disulfide introduced into the reaction zone. The reaction is terminated when the pH of the mother liquor of the reaction is in the range from about 0.05 to about 0.5.

The oxidation conversion step of the present invention is advantageous in that it obviates the fine grinding operation. That is, the molybdenum ore or concentrate typically is separated from other minerals, usually copper, as by flotation, and the molybdenum particles can be utilized as received without the additional step of fine grinding. As a consequence, concentrate having a particle size of 65 mesh, or finer, may be treated directly in the oxidation conversion operation, whereas the prior art requires the fine grinding.

It has also been discovered that the yield of molybdic trioxide in the solid phase and the total oxidative conversion of molybdenum disulfide (to molybdic trioxide and molybdate ion) may be increased by scrubbing the molybdenite ore concentrate with a caustic base in a stirred slurry containing a high content of solids, and then dewatering, by decanting and/or filtering, the liquid phase from the solids before commencing the oxidation reaction.

In preferred embodiments of the process, the oxidative conversion is 99+ mol percent, and the contaminating sulfur content of the product solids fraction is not greater than 0.2 weight percent of the product molybdic trioxide. (Unless otherwise noted, all percentages herein are by weight).

The charge to the process is typically an ore concentrate comprising predominantly ground or finely divided molybdenite (which is the mineral term for molybdenum disulfide), and wherein the molybdenum content of the ore concentrate is generally greater than 35 weight percent. It is to be understood that ore concentrates from various mines and beneficiating plants vary substantially in their characteristics, even if their chemically analyzed molybdenite content is substantially the same, and hence the optimization of the process variables of the invention described herein will depend upon the specific source and characteristics of the ore concentrate being processed.

In conducting the process, the ore concentrate is slurried with water in a reaction zone, the solids content of the slurry being in the range of from about 5 to about 25 weight percent, advantageously about 12–15% of the slurry. The slurry is then heated to the desired reaction temperature, in the range of from about 150° to about 230° C., and preferably to the range of about 185°–205° C. The reaction is initially exothermic and generally requires cooling by indirect heat transfer means. After about 30–60 minutes, the exothermicity declines, and heat may need to be supplied by indirect means.

The strong hydroxide, as referred to herein, to be employed in the reaction zone is intended to mean sodium hydroxide, preferably, or potassium or ammonium hydroxide. It may be added to the slurry at any point in time up to and including the occasion when the slurry reaches the desired reaction temperature, but preferably the strong hydroxide is added to the slurry prior to increasing the temperature thereof above ambient. The amount of strong hydroxide to be employed is in the range of from about 0.12 to about 1.68 mols per mol of molybdenum disulfide, preferably in the range of from about 0.48 to about 0.90 mols per mol of molybdenum disulfide. The strong hydroxide may be added as a solid or as a liquid concentrate. It should be understood that the stoichiometric mol ratio of a strong hydroxide to molybdenum disulfide required for the process disclosed by Dresher, et al. is 6. The weight amounts of sodium hydroxide, per weight equivalent molybdenum in the ore concentrate (i.e. NaOH/Mo weight ratio), which may be employed are in the range of about 0.05 to about 0.70, which corresponds to the above-stated 0.12–1.68 stoichiometric molar amounts.

Gaseous molecular oxygen is introduced into the slurry in the reaction zone during the reaction as necessary to maintain as oxygen partial pressure of in the range of from about 50 to about 500 psia, preferably in the range of from about 200 to about 400 psia. The total pressure maintained on the reaction zone is such as to provide for the above-mentioned oxygen partial pressure. Additional pressure in excess of that required to satisfy such criteria is not necessary.

During the reaction, the slurry is stirred, preferably by mechanical means.

The reaction is continued for a desired period of time, typically in the range of about 2–4 hours in batch processing, or the equivalent in continuous processing, until the conversion of the molybdenum disulfide is essentially complete, or no further reaction is occurring, and the pH of the slurry is in the range from about 0.05 to about 0.5, preferably about 0.15 to about 0.45. The time of reaction will vary substantially depending upon the characteristics of the ore concentrate, and is not a primary variable. However, it has been discovered that the reaction time needed to obtain maximum economic conversion of the molybdenum disulfide and on-stream utilization of the apparatus is shorter when a strong hydroxide is added in the amount defined herein to the reaction zone than if it is not employed, all other variables being constant.

When the reaction is terminated, the slurry is dumped from the reaction zone and the solids are separated from the mother liquor by decanting and/or by filtering. The mother liquor may be employed in further processing, for instance, to recover the molybdenum content thereof or the rhenium-containing compounds in the mother liquor. The solids comprise predominantly the product molybdenum trioxide monohydrate. This product may be further purified and/or dried by known means or employed directly without further purification as an ingredient in some processes, such as an alloying addition in the steel industry.

Molybdenite ore concentrates contain up to about 7% of the hydrocarbon flotation oils employed in the flotation extraction process by which they are derived. It has been found advantageous with some ores and ore concentrates to remove the predominant portion of the flotation oils to provide for increased efficiency in the oxidation reaction. This deoiling process generally involves heating the concentrate to remove these oils. This procedure, however, requires relatively expensive equipment, plus being an energy consuming step. Furthermore, the volatilized oils must be controlled by combustion, condensation or some other means to avoid air pollution.

It has been found that the flotation oils can be satisfactorily removed by scrubbing the concentrate with a strong alkali solution prior to the oxidation step. One method for accomplishing this is to pre-treat the concentrate with a strong alkali solution, using a high solids content slurry with agitation such that the molybdenite particles are caused to rub against, or scrub, one another. Such a procedure is generally referred to as attrition scrubbing. Employing the attrition scrubbing process further increases the conversion of molybdenum disulfide to molybdic trioxide.

In the attrition scrubbing process, the ore concentrate particles are slurried in an aqueous solution of a strong alkali, such as sodium, potassium or ammonium hydroxide, or sodium carbonate, and vigorously stirred. Unlike the oxidation reaction process, the solids content of the slurry should be high, over 40% and advantageously in the range of about 60 to about 75%. The amount of strong alkali employed is not chemically related to the molybdenum content of the ore concentrate and may suitably be in the range of about 1 to about 10 lbs. of, for instance, sodium hydroxide per ton of ore concentrate, advantageously sufficient to maintain the pH of the high solids content slurry above about 11, up to a maximum of 12–13, during the attrition scrubbing process. A minor amount of surfactant, of the type classed as wetting agents, may be added to the slurry during the attrition scrubbing process. The process may be conducted at ambient temperature and pressure.

After the attrition scrubbing process, the scrubbed solids are separated (i.e., dewatered) from the liquor by decanting and/or filtering. The solids may then be introduced into the reaction conversion zone described above. Alternatively, and preferably, the solids are washed again by being slurried, in ordinary water, to a solids content of about 20–30%, and separated from the wash water by decanting and/or filtering before being introduced into the conversion reaction zone.

EXAMPLES

The following examples are illustrative of the invention and are not intended to be limiting in scope.

The reactions in the following examples were carried out in a two-liter autoclave. At the start of each test approximately one liter of tap water or sodium hydroxide solution was added to the autoclave reactor along with the appropriate weight of concentrate. The autoclave was sealed and the heating cycle initiated. When the desired reaction temperature was reached, the autoclave was vented for a few seconds to expel air. Oxygen was then introduced into the reactor to a particular pressure and held at this pressure with a regulator. The reaction time was determined from the time of oxygen addition. A temperature regulator was set to supply heat when the temperature fell below the desired reaction temperature. Excess heat, produced by the exothermic oxidation, was removed by cooling water circulated through coils inside the reactor. When the reaction was completed, the reactor was then opened and the reaction products removed for subsequent analysis.

In the first two examples, a molybdenite ore concentrate was reacted, as received, both with and without the addition of sodium hydroxide to the autoclave. Molybdenite conversion in the presence of the proper amount of NaOH was 96.2% while without NaOH, but under the same autoclave oxidation conditions (time, temperature, etc.) it was only 62.7%.

EXAMPLE 1

154.0 grams of a molybdenite ore concentrate (53.7% Mo) as received, without any pretreatment (i.e., without grinding, drying, or deoiling), were slurried with 1000 grams of water and 22.4 grams of sodium hydroxide. The NaOH/Mo weight ratio was 0.270 (NaOH/Mo molar ratio=0.65) and the initial slurry pH was 13.5. The slurry was reacted in the autoclave at 195° C. and a total pressure of 500 psig. An oxygen atmosphere was maintained in the autoclave with an oxygen partial pressure of about 310 psig. The reaction time was four hours.

At the completion of the reaction the pH was 0.29. Analysis of the products, solution plus solids, showed that 96.2% of the molybdenite had been converted to molybdic trioxide.

EXAMPLE 2

A second 154.0 gram smaple of the same molybdenite concentrate was reacted under identical conditions, but without the addition of NaOH to the autoclave. The molybdenite concentrate was reacted under identical conditions, but without the addition of NaOH to the autoclave. The molybdenite conversion was only 62.7%.

Examples 3 through 12 demonstrate the advantage of adding sodium hydroxide within the range defined in the patent in processing molybdenite ore concentrates that have been treated to remove flotation oils. In examples 3 through the oils were removed by heating, or drying, at 240° C. In examples 8, 10 and 11, the oils were removed by the more conveninent and economical process of attrition scrubbing the ore concentrate with a sodium hydroxide solution as described herein.

EXAMPLE 3

154.0 grams of another molybdenite ore concentrate (54.4% Mo), previously dried at 240° C. to remove flotation oils, but not ground, were slurried with 1000 grams of water and 21.5 grams of sodium hydroxide. The NaOH/Mo weight ratio was 0.250 (NaOH/Mo molar ratio=0.60) and the initial slurry pH was greater than 13. The slurry was reacted in an autoclave at 195° C. and a total pressure of 500 psig. An oxygen atmosphere was maintained in the autoclave with an oxygen partial pressure of 310–315 psi. The reaction time was four hours.

At the completion of the reaction the pH of the slurry was 0.15. The slurry was filtered and the filter cake washed. The filtrate and washings were combined and analyzed for molybdenum, as was the filter cake. The solution volume was 1.225 liters and contained 6.6 grams/liter molybdenum. It was found that 99.2% of the molybdenite had reacted to form hexavalent molybdenum, of which 9.5% was dissolved in the solution phase as molybdate ions and 90.5% remained in the leach solids as molybdic trioxide. The filter cake was dried to convert the solids to technical grade molybdic trioxide. Analysis of this product showed it to contain 0.05% sulfur. The sulfur specification for technical grade molybdenum trioxide is generally 0.2% sulfur or less.

EXAMPLE 4

Another 154.0 grams of the same molybdenite concentrate, pretreated the same as the sample in Example 3, were slurried with 1000 grams of water. In this example, however, there was no addition of sodium hydroxide. The initial slurry pH was 5.8. The slurry was reacted in an autoclave under the same process conditions a the sample in Example 3. At the completion of the reaction the slurry pH was less than 0.0. The slurry was filtered and the filter cake washed with deionized water. The volume of the combined filtrate and washings was 1.225 liters and contained 8.0 grams/liter molybdenum.

Complete analysis of the product showed that 97.2% of the molybdenite had reacted to form hexavalent molybdenum, of which 11.8% was dissolved in the solution phase and 88.2% remained in the leach solids as molybdic trioxide. Analysis of the dried solids product showed it to contain 0.50% sulfur, and it therefore did not meet the specifications for a technical grade molybdenum trioxide.

EXAMPLE 5

A third identical test sample was treated in the same fashion except that 71.6 grams of sodium hydroxide were added giving a NaOH/Mo weight ratio of 0.833 (NaOH/Mo molar ratio=2.0). The pH of the reacted slurry was 0.55. However, under these conditions only 93% of the molybdenite had reacted. Furthermore, 45% of the conversion product was dissolved in the aqueous phase. The combined filtrate and washings contained 25.5 grams/liter of molybdenum as molybdate.

In the following Examples 6 and 7, a low grade molybdenite ore concentrate was treated in the same manner as the concentrate in Examples 3 and 4 above, that is, after drying to remove flotation oils it was reacted in an autoclave with and without, respectively, the addition of sodium hydroxide. When the concentrate was reacted with the addition of sodium hydroxide (Example 6) as described herein, 100% conversion of the molybdenite was achieved and therefore a product meeting the sulfur specification of a technical grade molybdenum oxide could be prepared by then drying to remove absorbed and combined water.

Under the same process conditions, but without the addition of sodium hydroxide (Example 7) in the range specified herein, only 97.3% of the molybdenite in the concentrate was converted to molybdic acid. Further purification would therefore be reuqired to prepare a molybdenum oxide product meeting the commercial specifications for a technical grade molybdenum trioxide. This purification might involve, for instance, extracting the molybdenum oxide with ammonia, recovering ammonium dimolybdate by evaporative crystallization, heating the ammonium dimolybdate to drive off ammonia and convert it to molybdenum trioxide, and recovering the ammonia so that it can be recycled in the process. The economic advantage of being able to obtain 99% or greater molybdenite conversion under relatively mild autoclave conditions is significant.

EXAMPLE 6

A further sample of 154.0 grams of a low grade molybdenite ore concentrate (39.6% Mo) previously dried at 240° C. to remove flotation oils, but not ground, was slurried with 1000 grams of deionized water containing 16.4 grams of sodium hydroxide. The NaOH/Mo weight ratio was 0.258 and the initial slurry pH was greater than 13. The slurry was reacted in an autoclave at 185° C. and a total pressure of 500 psig for four hours. An oxygen atmosphere was maintained in the autoclave with an oxygen partial pressure of 350 psi.

At the completion of the reaction the pH of the slurry was 0.43. The slurry was filtered as before. Analysis showed that 100% of the molybdenite had been converted, of which 16.3% was dissolved in the aqueous phase and 83.7% was precipitated in the leach solids as molybdic trioxide.

EXAMPLE 7

Another 154.0 grams of the same deoiled molybdenite concentrate as used in Example 6 were slurried with 1000 grams of water. In this example, however, there was no addition of sodium hydroxide. The initial slurry pH was 4.26. The slurry was reacted in an autoclave under the same conditions as the sample in Example 6. The slurry was filtered and the products analyzed as in Example 6. Only 97.3% of the molybdenite had been converted, 17.5% of which was dissolved in the aqueous phase.

In the absence of sodium hydroxide, the proportion of reacted molybdic acid that reported to the aqueous phase increased by 7.4%. Furthermore, 2.7% of the molybdenite was unreacted at the end of the reaction. The calculated sulfur content of the residue, due to the unreacted molybdenite contained therein, would be 0.8%, substantially above the sulfur specification of 0.2% maximum.

In the following Examples 8-11, the molybdenite concentrates were deoiled by attrition scrubbing with sodium hydroxide rather than by heating at 240° C. Although the removal of the oils was not quite as effective in the examples cited below as that obtained by heating or drying at 240° C., the economical and environmental advantages of attrition scrubbing as opposed to driving off or volatilizing the oils by heating should be apparent.

EXAMPLE 8

400 grams of the same molybdenite concentrate as in Examples 3, 4, and 5 above (54.4% Mo) as received without any pretreatment (i.e., without grinding, drying, or deoiling) were scrubbed at 75% solids for five minutes with sodium hydroxide addition to pH 12.2. The pulp was filtered, repulped to 25% solids and refiltered. 169.7 grams of the wet pulp (90.75% solids) were added to the autoclave along with 20.9 grams NaOH (a NaOH/Mo weight ratio of 0.25) dissolved in 1000 grams of water. The slurry was reacted at 195° C. and a total pressure of 500 psig for four hours. The oxygen partial pressure was 310-315 psi.

At the completion of the reaction the pH of the slurry was 0.15. Analysis of the products showed that 98.3% of the molybdenite had been converted.

EXAMPLE 9

A second portion of the same molybdenite concentrate without prior removal of the flotation oils was reacted under identical conditions, but without the addition of NaOH to the autoclave. The molybdenite conversion was only 92.5%.

EXAMPLE 10

400 grams of the same molybdenite concentrate as in Examples 6 and 7 above (39.6% Mo) as received without any pretreatment (i.e., without grinding, drying, or deoiling) were scrubbed at 75% solids for five minutes with sodium hydroxide addition to pH 12.2. The pulp was filtered, repulped to 25% solids and refiltered. 192.0 grams of the wet cake were added to the autoclave along with 16.8 grams NaOH/Mo weight ratio=0.25) dissolved in 1000 grams water. The slurry was reacted at 195° C. and a total pressure of 500 psig for four hours. The oxygen partial pressure was 310-315 psi.

At the completion of the reaction the slurry pH was 0.45. The slurry was filtered and the filter cake washed with deionized water. The volume of the combined filtrate and washings was 1.235 liters and contained 7.42 grams/liter of molybdenum.

Complete analysis of the products showed that 98.4% of the molybdenite had reacted to form molybdic acid.

EXAMPLE 11

A second sample of the same molybdenite concentrate, attrition scrubbed with NaOH as above was reacted under identical conditions but without the subsequent addition of NaOH to the autoclave. The total molybdenite conversion was 93.6%.

EXAMPLE 12

A third sample of the same molybdenite concentrate, this time without prior removal of the flotation oils, was reacted under the same conditions as above, but without the addition of NaOH to the autoclave. The total molybdenite conversion was 88.7%.

For maximum effectiveness of the process of this invention, prior deoiling of the concentrate by attrition scrubbing with a base such as sodium hydroxide is to be preferred. It should be understood that increasing the reaction time or reaction temperature slightly would be sufficient to insure essentially 100% conversion of molybdenite to molybdenum trioxide in Examples 8 and 10 above. However, in the absence of sodium hydroxide, such as in Examples 9, 11 and 12, much longer reaction times and/or temperatures would be required to obtain the desired results to the point of being commercially impractical and/or uneconomical. For instance, at 230° C. severe corrosion is experienced in the autoclave even when it is constructed of rather exotic materials (e.g., zirconium, nickel and molybdenum alloys).

Whereas there are here specifically set forth certain preferred embodiments which are presently regarded as the best mode of carrying out the invention, it should be understood that various changes may be made and other procedures adopted without departing from the inventive subject matter particularly pointed out and hereinafter claimed.

Having thus described the invention, what is claimed is:

1. In a process for the conversion in a reaction zone of a molybdenum disulfide to molybdic trioxide by maintaining an agitated aqueous liquid slurry of particles of molybdenum disulfide-bearing material at a temperature in the range of from about 150° to about 230°0 C. in contact with gaseous molecular oxygen having a partial pressure in the reaction zone in the range of from about 50 to about 500 psi for a period of time sufficient to effect conversion of molybdenum disulfide to molybdic trioxide and thereafter recovering product solid molybdic trioxide from said slurry, the improvement of adding to said reaction zone in the range of from about 0.12 to about 1.68 mols of a strong hydroxide per mol of molybdenum disulfide and continuing said conversion reaction until the pH of said slurry is in the range of from about 0.05 to about 0.5 and thereafter separating from said slurry a solids fraction containing predominantly molybdic trioxide.

2. The improved process of claim 1 wherein said strong hydroxide is sodium hydroxide.

3. The improved process of claim 1 wherein the amount of said strong hydroxide is in the range of about 0.48 to 0.90 mols per mol of molybdenum disulfide.

4. The improved process of claim 1 wherein said process is continued until the pH of said slurry is in the range of from about 0.15 to about 0.45.

5. The improved process of claim 1 wherein the temperature of the reaction zone is maintained in the range of about 185°-205° C.

6. The improved process of claim 1 whereby a greater percentage of molybdenum disulfide is converted to molybdic trioxide than in a conversion process otherwise the same but without the inclusion of said strong hydroxide in said reaction zone.

7. The improved process of claim 1 wherein the total conversion of molybdenum disulfide to hexavalent molybdenum is not less than 95%.

8. The improved process of claim 1 wherein the conversion of molybdenum disulfide to hexavalent molybdenum is not less than 99 mol percent, and the sulfur content of the solid product is not more than 0.2% of the molybdic trioxide therein.

9. The improved process of claim 1 wherein said molybdenum disulfide-bearing material is pre-treated prior to being introduced into said reaction zone by scrubbing agitation in an aqueous alkali solution slurry comprising at least 40% solids and the liquid phase separated therefrom before said materials are introduced into said reaction zone.

10. The improved process of claim 9 wherein said material is scrubbed, dewatered, reslurried, and again dewatered before introduction into said reaction zone.

11. The improved process of claim 9 wherein a surfactant is added to said aqueous alkali solution.

* * * * *